United States Patent [19]
Alagna

[11] 3,998,388
[45] Dec. 21, 1976

[54] RECIPROCATOR

[76] Inventor: Anthony M. Alagna, 4001 Elm St., Downers Grove, Ill. 60515

[22] Filed: Feb. 26, 1976

[21] Appl. No.: 661,693

[52] U.S. Cl. .............................. 239/187; 118/323; 134/172; 239/281

[51] Int. Cl.[2] ...................... B05B 3/18; B08B 3/02; F16N 13/22

[58] Field of Search .......... 239/186, 187, 191, 281; 118/241, 242, 254, 321, 323; 15/304, 316 R; 164/72, 267; 427/236; 184/15 R; 134/102, 116, 167 R, 171, 172, 197

[56] References Cited

UNITED STATES PATENTS

| | | | |
|---|---|---|---|
| 3,172,606 | 3/1965 | Reynolds et al. | 239/186 |
| 3,248,762 | 5/1966 | Wagner | 164/267 X |
| 3,393,658 | 7/1968 | Ott | 239/186 X |
| 3,463,399 | 8/1969 | Ott | 239/186 |
| 3,482,652 | 12/1969 | Stone | 184/15 R |
| 3,544,355 | 12/1970 | Ott | 164/267 X |
| 3,592,387 | 7/1971 | Pilott et al. | 239/186 |

*Primary Examiner*—Johnny D. Cherry
*Assistant Examiner*—Andres Kashnikow
*Attorney, Agent, or Firm*—Leydig, Voit, Osann, Mayer & Holt, Ltd.

[57] ABSTRACT

A reciprocator for traversing a fluid actuated apparatus between retracted and extended positions and for supplying fluid to said apparatus for operation thereof. While the invention is adaptable to various specific configurations, it is illustrated in the context of a die lubricator. A supporting structure includes drive means in the form of a pneumatic cylinder and support means in the form of a plurality of telescoping tubes. The tubes each have a fixed end attached to the supporting structure, an intermediate portion journalled for linear motion in the supporting structure and a free end carrying the fluid actuated apparatus. Fluid supplies are connected to the fixed ends of the telescoping tubes so that, in addition to the support function, the tubes serve as conduits of actuating fluid for the reciprocatable apparatus.

23 Claims, 7 Drawing Figures

RECIPROCATOR

This invention relates to reciprocators and, more specifically, to those for reciprocating a fluid actuated apparatus between retracted and extended positions and for supplying fluid to the apparatus for operation thereof.

Both pneumatic and hydraulic reciprocating apparatus are known, being used, for example, in the die casting or forging industries for lubricating dies between operations. In such applications, it is necessary to maintain a fluid actuated apparatus in the form of a spray head in a retracted, rest position while the dies are operational, and after the dies are parted and the cast or forged article removed, to extend the spray head between the dies to spray a lubricant or release agent onto the dies in preparation for their next operation. While reciprocating die lubricators have been devised which are capable of performing their intended function, those known heretofore have generally been characterized by a relatively cumbersome approach to supplying the fluid to the reciprocatable spray head. More specifically, one or more flexible hoses or the like generally connect a fixed supply to the movable head and these are required to move or flex in unison with the reciprocating member. These hoses must generally be looped or otherwise arranged to allow sufficient travel of the movable ends thereof without causing crimps, bends or other localized stresses. Additionally, the machine must be configured to provide sufficient clear area for travel of the movable, flexible hoses. Reciprocating spray lubricators of this sort are shown in Ott U.S. Pat. Nos. 3,393,658, 3,463,399 and 3,544,355, Reynolds U.S. Pat. No. 3,172,606 and Stone U.S. Pat. No. 3,482,652.

In view of the foregoing, it is a general aim of the present invention to provide a reciprocator for traversing a fluid actuated apparatus between retracted and extended positions and supplying fluid for operation thereof free of looped flexible hoses, or the like.

More specifically, it is an object of the present invention to provide such a reciprocator having a plurality of telescoping tubes, said tubes serving both to support the reciprocatable fluid actuated apparatus and to supply said apparatus with the necessary fluid.

According to one specific adaptation of the invention, it is an object to provide a reciprocating die lubricator having a spray head mounted on a reciprocatable manifold, such manifold being supported from a fixed base on a plurality of telescoping tubes, such tubes serving to supply fluid via the manifold to the spray head.

Other objects and advantages will become apparent from the following detailed description when taken in conjunction with the drawings in which.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
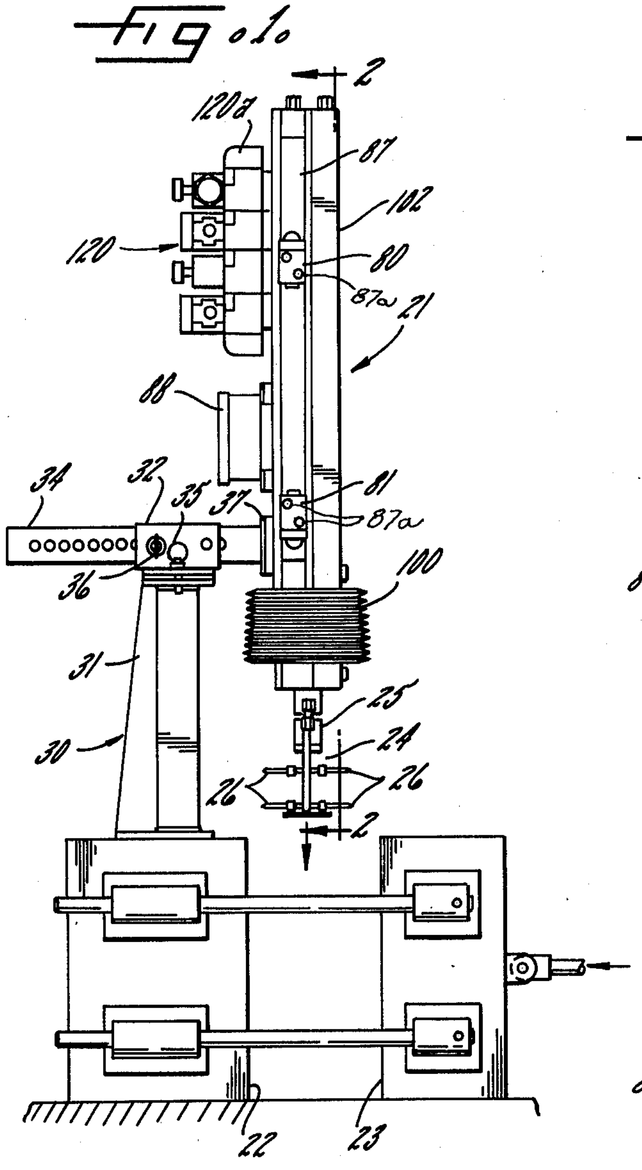
FIG. 1 is a side elevational view, partially diagrammatic, illustrating a reciprocating die lubricator exemplifying the present invention.

Turning now to the drawings, and particularly to FIG. 1, there is shown a reciprocator embodied as a reciprocating die lubricator, generally indicated at 21, adapted to lubricate opposed dies, schematically indicated at 22, 23. The dies, forming no part of the present invention, are illustrated only in diagrammatic form and include a fixed die 22 cooperating with a movable die 23. The dies are brought into cooperative relation during a cycle by moving the die 23 toward the die 22 as indicated by the arrow. After a cycle is completed, the dies are again separated and the formed article removed. At that point, the reciprocator 21 is actuated to move a spray head 24 from the illustrated retracted position to the extended position between the dies. During a portion of the traverse of the spray head 24 a release agent may be sprayed on both the stationary and movable dies via nozzles 25. On the return stroke, blow air may be forced against the cooperating dies via nozzles 26 for the purpose of clearing any chips or residue from the dies. It will be apparent that the illustrated die lubricator has utility in both the die casting and forging industries.

In the embodiment illustrated in the drawings, the reciprocator 21 is supported on a suitable surface via an adjustable stand 30. The stand 30 includes a fixed vertical support 31 having a rotatable member 32 telescoped into an aperture so as to allow the reciprocator to be rotatably adjusted about a vertical axis through the centerlne of the stand 30. The member 32 provides horizontal bore into which a supporting post 34 is inserted, the supporting post having a plurality of apertures allowing the reciprocator to be positioned distances from the base member. Both the rotatable member 32 and the support post 34 are fixed in position after adjustment by appropriate pins 35, 36.

The slidable support member 34 provides flange 37 to which the supporting structure of the reciprocator itself is affixed. As shown in greater detail in FIG. 4, the flange 37 is secured via bolts 38 to a supporting base 39 of the reciprocator 21. The base 39, as most clearly shown in FIG. 4, extends vertically and is affixed to opposed blocks 40, 41 which, as will be described in more detail below, form cylinder heads for a driving cylinder 42. It is seen that a cylinder body 43 is interposed between the heads 40, 41, the heads being drawn firmly together against the cylinder body by a plurality of tie rods 45. The base plate 39 and cylinder heads 40, 41 form the main supporting structure for the reciprocator, further buttressed, as will be indicated below, by protective cover members.

Figure 2:
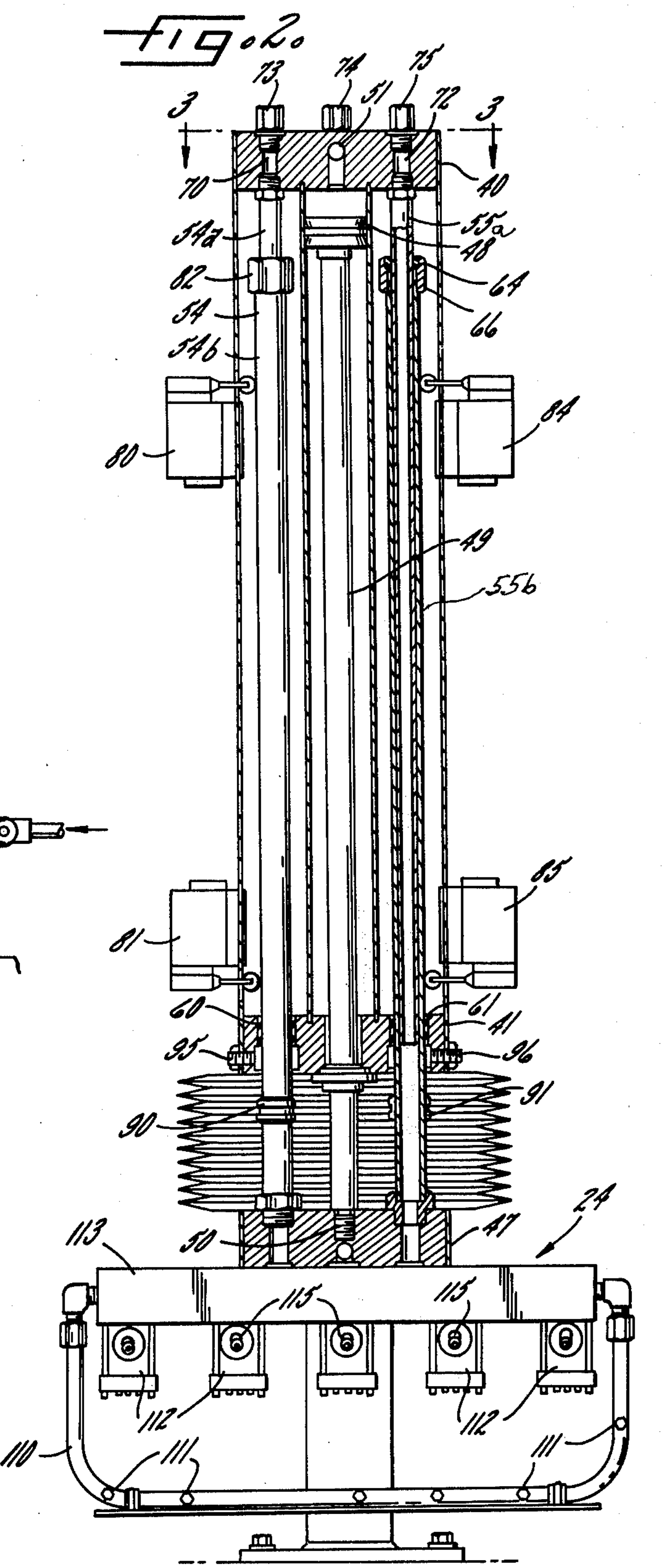
FIG. 2 is a sectional view taken generally along the lines 2—2 of FIG. 1.

Reciprocatably attached to the supporting structure is a manifold 47 having attached thereto a fluid actuated device, in the present instance being spray head 24. Drive means are provided for reciprocating the manifold and attached spray head between retracted and extended positions, shown herein as the cylinder 42 and its associated piston 48 and piston rod 49. As best shown in FIG. 2, the piston rod 49 is affixed at its lower end to the reciprocable manifold 47, such as by the threaded engagement indicated at 50. A port 51 in the upper cylinder head allows high pressure air to be introduced above the cylinder 48 causing the rod thereof to be extended thereby advancing the reciprocatable manifold 47 to its extended position. A similar port 52 is provided in the lower cylinder head 41 to allow high pressure air to be introduced into the cylinder 43 below the piston 48 for driving the reciprocatable manifold 47 to its retracted position.

In accordance with the invention, support means are provided, operating in conjunction with the piston rod 49 to support the manifold 47 for reciprocation, such support means also serving to convey fluid to the manifold. To that end, a plurality of telescoping tube sets 54, 55 and 56 are provided, each set being composed of two sections, an inner section, such as 54*a*, and an outer section such as 54*b*. The outer section fits closely over the inner section but is slidable thereover in telescoping fashion. The free ends of the inner sections 54*a*, 55*a*, 56*a* are affixed to the supporting structure, such as by threaded portions secured in the upper cylinder head 40. The free ends of the outer sections 54*b*, 55*b*, 56*b* are secured to the reciprocatable manifold 47, such as by threaded engagement. Means are provided for journalling the outer sections 54*b*–56*b* in the support structure for sliding movement. As a result of the fixed connection of the inner section and the journalled support of the outer section, the tubes 54–56 serve to support the manifold 47 while allowing reciprocation thereof. Journalling is accomplished in the illustrated embodiment by means of bearings 60, 61, 62 which preferably are bronze graphite bushings selected to eliminate shaft brinelling, and to make the assembly less sensitive to dirt and heat. However, in certain applications linear ball bushings may also be used.

Figure 7:
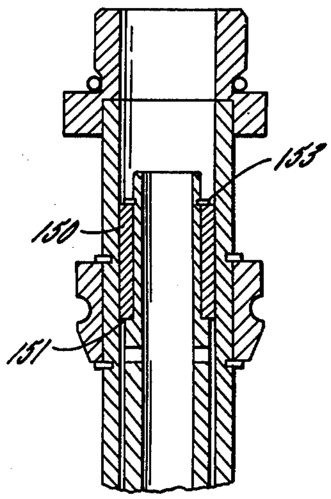
FIG. 7 is a fragmentary view, in section, showing an alternative construction of the telescoping tubes having bearing means interposed between the inner and outer tubes.

In certain applications, such as severe requirements, or where the fluid actuated device to be reciprocated is quite heavy, it may be necessary to provide further support for the telescoping tubes. In many cases, especially when the reciprocator is mounted vertically, the outer surface of the inner tube and the inner surface of the outer tube mate with sufficient precision to adequately support the reciprocating elements. It is noted that typically the telescoping tubes are hard-chromed and ground in order to increase abrasion resistance. However, where additional support and wear resistance is desired, bearing means may be interposed between the outer and inner tubes. This modification is shown in fragment in FIG. 7 where a linear bushing 150 is installed at the lower end of the inner tube, retained in position on the inner tube and allowing the outer tube to slide thereover. The bearing rests on a step 151 formed in the inner tube, and is retained in position by means such as a snap ring 153. The additional support provided by bearing 150 serves to protect the mating surfaces of the tubes, prevent excessive wear, and lend additional stability to the reciprocatable structure.

Figure 3:
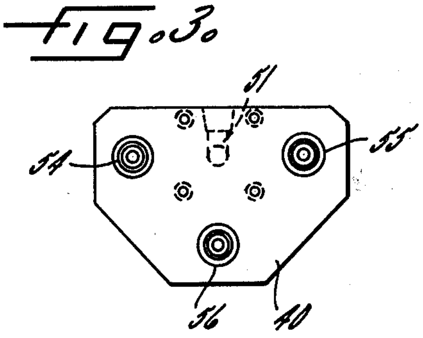
FIG. 3 is a horizontal section taken generally along the lines of 3—3 of FIG. 2.

As best shown in FIG. 3, the three guide rods are arranged in a triangular configuration with the piston drive rod 49 central thereof, the triangular configuration serving to lend adequate support to the reciprocatable assembly independently of the attitude in which the reciprocator is mounted. More specifically, the reciprocator need not be mounted vertically as illustrated in FIG. 1, but may also be mounted in other attitudes, such as horizontally. It has been found that due to the "triangulation" of the rods, adequate support is provide independently of the attitude in which the reciprocator is mounted.

In order to prevent fluid leakage from the telescoping tube conduits, sealing means are provided, illustrated in FIG. 2 as packing 64 interposed between the tubes and retained in position at the upper portion of the outer tube. A wiper ring is also provided in that area so as to prevent dirt or the like from entering the conduit. For securing the packing in place, retaining means shown herein as retaining nut 66 is threadedly engaged with the outer tube for holding the packing and wiper in place. It will be appreciated that each of the fluid carrying tubes is sealed in the manner just described.

For providing fluid to the tubes for conveyance to the reciprocatable manifold, means are provided for connecting a source of fluid to the upper stationary ends of the inner tubes. Accordingly, the upper cylinder head is ported as shown at 70. 71 and 72, and provided with suitable connectors 73, 74, 75 to be connected via appropriate tubing, conduits, or the like to sources of fluid. It is, therefore seen that no flexible or looped connections are required between the fluid source and the reciprocatable manifold. Connections between the source and the stationary ends of the tubes may be rigid if desired, formed, for example, of copper tubing, while the sealed and telescoping tubes provide fluid to the movable head throughout the traverse thereof.

According to one feature of the illustrated embodiment, at least one of the telescoping tubes and the retaining means thereon are adapted to indicate the position of the reciprocatable manifold to a control system. To that end, one or more limit switches are provided, mounted on the supporting structure and having actuators positioned to engage the retainer 66 as the reciprocator traverses through its strock. In the illustrated embodiment each of the end telescoping tubes 54, 55 serve this function, limit switches 80, 81 being mounted on the left side of the reciprocator to engage retaining nut 82 and limit switches 84, 85 being mounted on the right of the reciprocator so that the actuators thereof engage retaining nut 66. It is seen that each of the actuators is positioned to ride along the associated outer tube as the outer tubes are reciprocated so that they are deflected from their normal position when engaged by the assoicated retaining nut 82 or 66. For allowing adjustment to detect selected positions of extension or retractions, the switches 80, 81, 84 and 85 are mounted in slots, slot 87 being illustrated in FIG. 1 with underlying clamping brackets engaged by screws 87*a*. Adjustment is achieved by positioning the switch at the appropriate point in its slot and tightening the screw to clamp the switch to its slot in the selected position. The switches 80, 81, 84 and 85 are electrically connected to a control circuit (not illustrated in detail), housed in enclosure 88. Such control ciruit, as is well known, is adapted to actuate appropriate valves to supply high pressure air to the upper or lower ports of the cylinder 42 for extending or retracting the spray head, and to supply lubricant, pilot air, and/or blow air to the associated conduits 73–75 at appropriate points in the traverse, in short, to control overall operation of the reciprocator.

Figure 4:
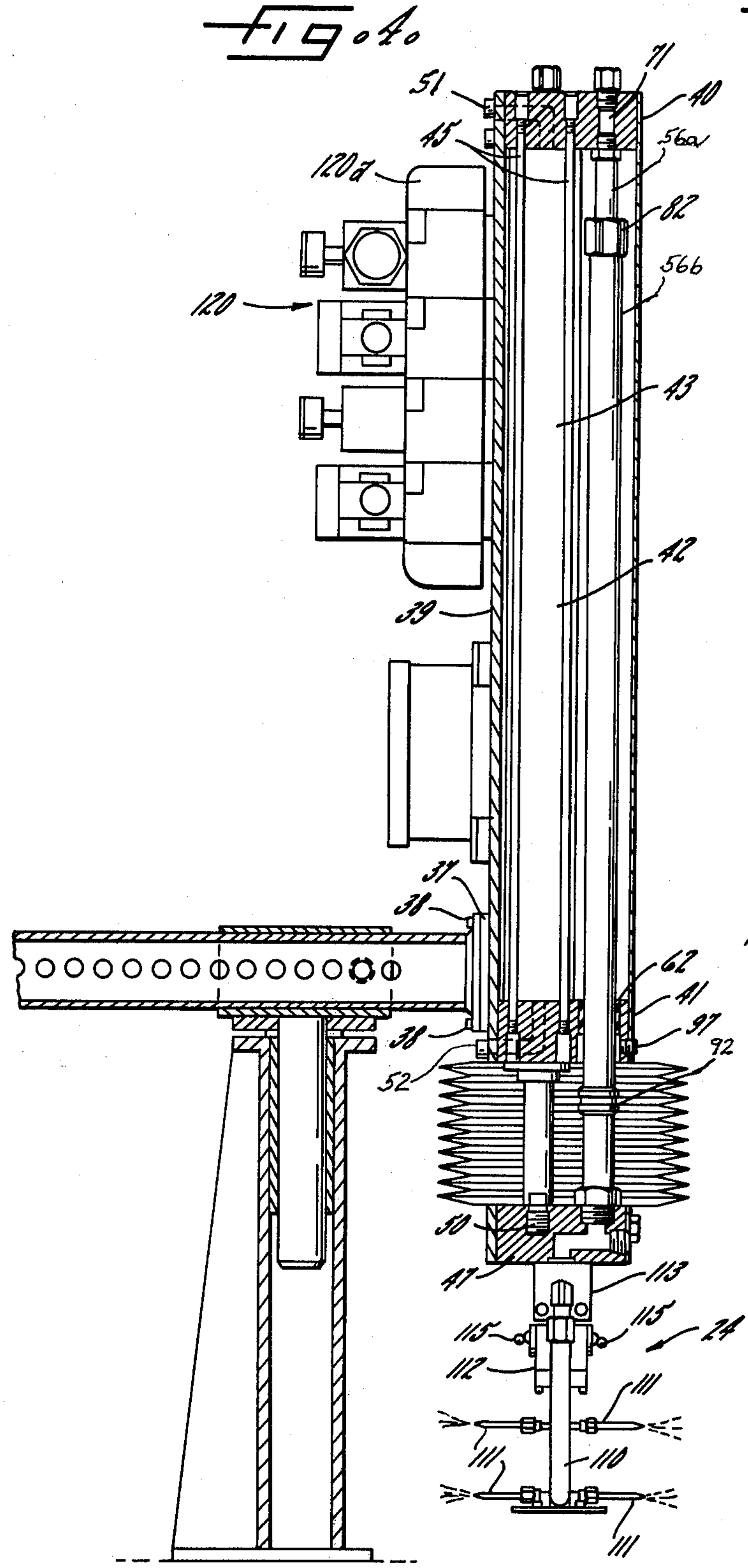
FIG. 4 is a horizontal elevation similar to FIG. 1 but showing the reciprocator on an enlarged scale.

For preventing drift of the spray manifold downward when idling between cycles, means are provided for mechanically engaging the reciprocatable portion of the assembly when in the retracted position, such means also providing a redundant failsafe feature. To that end, one or more of the telescoping tubes are provided with ball detent cams 90, 91, 92 secured to the outer, reciprocatable member of the telescoping tube assembly, and positioned to engage spring loaded ball detent members 95, 96, 97 when the reciprocator is in its fully retracted position. As a result, the assembly is fully supported mechanically when retracted and requires pressure to be applied to the upper portion of the cylinder in order to free the reciprocatable carriage from the restraining ball detent members. It is noted that both FIGS. 2 and 4 show the carriage in the slightly advanced position, the fully retracted position being achieved with the ball detent cams 90–92 engaged in the ball detent members 95–97.

In order to provide a measure of protection to the piston rod and the telescoping tubes, an expanding bellows 100 is provided having its upper end secured to the lower cylinder head 41 and its lower end secured to the reciprocatable manifold 47. The bellows encloses the area in which the piston rod 49 and telescoping tubes 54–56 extend so as to prevent foreign matter from accumulating on such elements. It should be noted that utilization of the bellows is allowed in part, because of the elimination of looped hoses or the like connected to the spray head.

Figure 5:
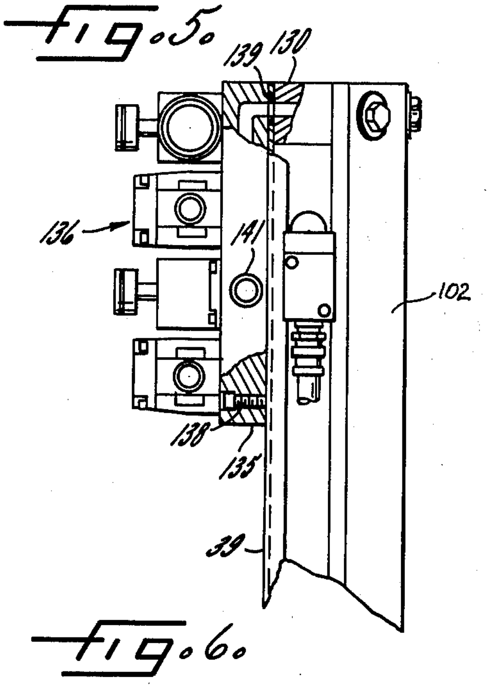
FIG. 5 is a fragmentary view showing the upper cylinder head and an alternative manifolding means for supplying fluid to the reciprocator.

As further illustrated in FIGS. 1 and 5, the front and side faces of the reciprocator are enclosed by means of a three sided cover assembly 102 bolted at all three sides to both the upper cylinder head 40 and the lower cylinder head 41. This cover not only provides additional protection for the telescoping tubes, but also serves to increase the structural rigidity of the overall assembly. It is noted that in certain applications using very long pneumatic cylinders, flexing is a problem; however, in the instant reciprocator, the support, including the base plate 39 buttressed by the cover assembly 102, absorbs most of the shearing forces preventing deflection of the cylinder.

The spray head illustrated in the drawings forms no part of the present invention and will not be described in detail. Suffice it to say, that the spray head includes means for attaching same to the reciprocatable manifold 47 so as to receive fluid conveyed therethrough via the telescoping tubes. The spray head serves to port blow air to a lower conduit 110 having a plurality of nozzles 111 mounted thereon. When blow air is supplied through the appropriate conduit, it is forced into the lower manifold 110 and out the nozzles 111 to clean debris or the like from the dies. The spray head also includes a plurality of atomizing nozzles 112 supplied via the spray head manifold 113 with both liquid (e.g. lubricant or release agent) and pilot air for atomizing the liquid. Accordingly, when both liquid and pilot air are supplied via the appropriate telescoping tubes to the spray head manifold 113, the fluid is atomized and sprayed onto the dies as directed by the nozzles 115.

Operating under the control of the electrical circuitry within the control box 88 are a cluster of solenoid operated valves generally indicated at 120, including appropriate guages, regulators and the like. The valves of the cluster 120 must be piped to the various ports of the reciprocator and because the piping is not required to move or flex, it may be rigid, formed, for example, of copper tubing. During manufacture appropriate valves within the cluster 120 are connected to connectors 73 and 75 for supplying air to the reciprocatable manifold, and to ports 51 and 52 for driving the cylinder. Typically, in a die lubricator arrangement the lubricant or release agent is supplied from a separate source having a solenoid valve associated therewith, such source and valve not being shown in the figures. Thus, during installation of the reciprocator, it is only necessary to connect a high pressure air supply to the manifold **120*a* on which the valves 120 are mounted, and a lubricant or release agent supply to connector 74.**

Figure 6:
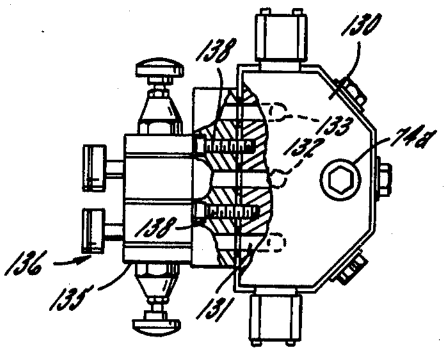
FIG. 6 is a plan view, partly in section, of the alternative manifolding means of FIG. 5.

Manufacturing may be further simplified, and an even more streamlined package provided by the alternative valve configuration illustrated in FIGS. 5 and 6 wherein the valves and manifold are directly ported to the upper cylinder head. Referring to FIGS. 5 and 6, there is shown a modified upper cylinder head 130 having ports 131, 132 and 133 projecting to the back of the cylinder head. Bolted over the cylinder head, with mating ports in communication with the ports 131–133 is a manifold 135. Mounted upon the manifold are a cluster 136 of valves, regulators, and indicators, as described above in connection with cluster 120. The manifold is affixed to the cylinder 130 and to the supporting plate 39 by appropriate mounting bolts 138. The mating ports of the manifold and cylinder head are arranged to allow interposition of sealing means such as O-ring 139 for preventing leakage of fluid between the manifold and cylinder head. In the illustrated embodiment, atomizing spray air provided by one of the valves in the cluster 136 may be coupled directly through the manifold, through port 131 to the appropriate telescoping tube to the reciprocatable manifold. Similarly, blow air may be coupled directly through the appropriate valve, the port 133 and its associated telescoping tube to the manifold. In the illustrated embodiment, the port 132 communicates with the upper chamber of the cylinder 42 so that energizing the appropriate valve supplies air through port 132 to the cylinder for advancing the reciprocatable manifold. At the lower portion of the manifold 135 is provided a port (not shown) connected by copper tubing or the like to the lower cylinder head port 52 so that energization of th appropriate valve supplies air to the port 52 for retracting the reciprocatable manifold. The illustrated cylinder head further includes a connector **74*a* for allowing connection of a supply of lubricant or release agent. During installation inlet air need must be connected to the manifold 135 via the connector 141 and release agent to the connector 74*a*.**

The control circuitry and associated valving is configured according to the specific requirements of the use to which the reciprocator is put. Because reciprocator and control circuits therefore are known, it is believed that structuring the control circuit and valving to suit the requirements of a given application is within the capabilities of one skilled in the art. Accordingly, further detailed description of these elements will not be provided. However, the following functional description of a cycle of operation will serve to illustrate the characteristics of an exemplary control system.

In the exemplary embodiment, blow air for cleaning the dies is passed through one of the solenoid actuated valves 120 to the telescoping tube 55 via the connector 75. Similarly, pilot air is passed through another solenoid operated valve within the cluster 120 via the connector 73 to the telescoping tube 54. Finally, liquid release agent or the like is provided through the connector 74 to the telescoping tube 56. The manifold 47 is arranged to port these various fluids to the appropriate location in the spray head manifold 113 so as to provide blow air to the lower conduit 110 and pilot air and liquid release agent to the spray heads 112.

One of the limit switches, such as the switch 80, may be positioned higher than shown so as to be actuated by the retainer 82 when the reciprocator is in its fully retracted position. A second limit switch, such as limit switch 84, may be positioned lower than switch 80 so that it is actuated by retainer 66 when the spray head is extended to the upper portion of the dies. A third of the limit switches, such as limit switch 81, is positioned so as to be actuated by the retainer 82 when the spray head is opposite a deep portion of the die, such portion requiring a brief dwell in travel of the reciprocator for complete lubrication. Finally, the limit switch 85 may be positioned to be actuated by the retainer 66 when the spray head reaches the lower portion of the die. It will be apparent that the switches may be positioned as desired on set up of the machine, and easily repositioned when the dies are changed, or it is desired to modify the cycle.

In operation, a cycle is initiated either automatically or manually after the dies 22, 23 are separated. High pressure air is supplied through one of the valves in the cluster 120 to the upper port 51 of the cylinder so as to begin to force the reciprocatable manifold and spray head in the downward direction. When the retainer 66 deflects the actuator of the switch 84 (indicating the spray head is at the top of the die) the appropriate valve within the cluster 120 is actuated causing pilot air to be coupled to the conduit 54 and liquid release agent to the conduit 56 thereby actuating the nozzles 112 to dispense release agent onto the surfaces of the dies. When the spray head advances to the position wherein the retainer 82 deflects the actuator of switch 81, the control circuitry will temporarily halt the advance of the reciprocator by stopping the flow of high pressure air to the upper portion of the piston. The reciprocator will dwell at this position for a predetermined time, and at the termination thereof will continue to advance in the downward direction. When the retainer 66 deflects the actuator of switch 85, the control circuit will be signalled to close the valve within cluster 120 providing pilot air and spray liquid, to close the valve providing high pressure air to the upper port of the cylinder, to open the valve providing high pressure air to the lower portion of the cylinder, thereby starting to retract the spray head, and to close the valve providing blow air to the conduit 55. Thus, the spray head will begin to rise under the control of the pneumatic cylinder while blow air is exhausted through the nozzles 111 thereby cleaning the dies and preparing them for their next operation. When the reciprocator is retracted to its fully home position, the retainer 82 will deflect the actuator of the switch 80, sending a signal to the control system terminating the cycle.

While the foregoing functional example is offered as one use of the reciprocator in a die lubricating environment, it will be apparent that the control system may be adjusted to provide other modes of operation. For example, the cycle may be modified to eliminate the dwell in the traverse, or to clean the dies with blow air on the advance stroke and spray lubricant on the retraction stroke.

While the illustrated embodiment was described as utilizing three telescoping tubes, it should be noted that in some cases a different number may be utilized. For example, and especially in vertical operation, one of the tubes may be eliminated, the reciprocatable assembly being supported by the piston rod and two of the telescoping tubes. In that application, blow air is not provided to the spray head, the spray head being simply adapted to atomize and spray a release agent.

In other applications it may be desired to provide additional fluids to the reciprocatable manifold, and additional tubes may be provided. For example, the cross sectional configuration of the cylinder heads (as shown in FIG. 3) may be modified to assume a rectangular configuration, and two additional tubes provided in alignment with tube 56 but opposite tubes 54 and 55. Further tubes may be provided, if desired, by simply extending the dimensions of the supporting blocks.

The invention was described herein with application to a reciprocating die lubricator, realizing that the spray head itself was simply one form of fluid actuated device usable with the reciprocator. It is, however, comtemplated that the reciprocator has application to traversing other forms of fluid actuated device. As a specific example, a hydraulically operated robot arm is carried for reciprocation by the device, the telescoping tubes serving as conduits for hydraulic fluid to operate the arm. Such an arrangement is useful as an extractor in the die casting industry for removing cast articles on separation of the dies. It has been found that the telescoping tubes are capable of carrying hydraulic fluid at pressure of 3,000 psi, thereby providing a structure which conveniently and safely couples high pressure hydraulic fluid to the apparatus operated thereby, while supporting same for reciprocation. Thus, the invention is generally utilizable with fluid actuated devices wherein it is desired to both reciprocate the fluid actuated device and provide fluid thereto, the telescoping tubes serving both the support and conduit functions.

I claim as my invention:

1. Reciprocating spray apparatus for traversing a spray head between extended and retracted position comprising, a support, reciprocatable manifold means for carrying said spray head and having ports for connection thereto, drive means attached to said support and having a driving member connected to said manifold means for reciprocating same between extended and retracted positions, a plurality of co-axial tube sets each having an inner tube and an outer tube slidable thereover, one end of each of said tube sets being fixed to said support and the opposite end connected to said manifold means at the ports therein, bearing means on said support for slidably supporting said tube sets at an intermediate position thereof, and means coupling fluid to be sprayed to the fixed end of one of said tube sets and pilot air for spraying said fluid to the fixed end of another of said tube sets, whereby said co-axial tubes serve as conduits for said fluid and pilot air respectively to said spray head while supporting same for reciprocation.

2. Apparatus as set forth in claim 1 wherein the support comprises a base plate, a pair of cylinder heads affixed to said base plate, a cylinder body interposed between said cylinder heads, tie rods interposed between said cylinder heads for drawing said heads to the respective ends of said cylinder, the fixed ends of said tube sets being connected to one of said cylinder heads, the other of said cylinder heads including means for supporting said bearing means.

3. Apparatus as set forth in claim 2 including means coupling blow air to a third one of said tube sets, whereby said third tube set serves as a conduit for blow air to said spray head.

4. Apparatus as set forth in claim 3 wherein said means coupling pilot air and blow air includes valve means for selectively controlling same said drive means including further valve means for supplying operating fluid to said cylinder, said one cylinder head having ports therein for carrying pilot air, blow air and operating fluid to the associated tube sets and the cylinder respectively, said valve means being mounted on a supply manifold having ports mating the ports in said cylinder head, and means connecting said supply manifold to said cylinder head with the associated ports thereof mated.

5. Apparatus as set forth in claim 3 wherein said tube sets are disposed in mutually parallel relationship and in a triangular pattern about said driving member, thereby to support and reciprocatable manifold means independently of the attitude in which said apparatus is mounted.

6. Apparatus as set forth in claim 1 wherein the support comprises a base plate havng two spaced blocks affixed thereto, said inner tubes each having an end affixed to one of said blocks, the opposite ends of the outer tubes being connected to said manifold means at the ports therein, the other of said blocks carrying said bearing means, said bearing means engaging said outer tubes for supporting said co-axial tube sets for reciprocation.

7. Apparatus as set forth in claim 6 further including internal bearing means interposed between the inner and outer tube of each tube set.

8. Apparatus as set forth in claim 7 wherein each of said inner tubes has a step formed at the end thereof opposite the fixed end, said internal bearing means including bushing means seated on said step and engaging the inner surface of said outer tube, and means retaining said bushing means in position on said step.

9. Apparatus as set forth in claim 6 including means coupling blow air to a third one of said tube sets, whereby said third tube set serves as a conduit for blow air to said spray head.

10. Apparatus as set forth in claim 9 wherein the drive means is a pneumatic cylinder, said cylinder having a body interposed between said block, a piston within said body and a piston rod affixed to said piston, the piston rod being connected to said manifold means for reciprocating same, and tie rods for drawing said blocks to said body whereby the blocks serve as cylinder heads.

11. Apparatus as set forth in claim 10 wherein the co-axial tube sets are arranged in a triangular pattern surrounding said cylinder, thereby to support said reciprocatable manifold means independently of the attitude in which said apparatus is mounted.

12. Apparatus as set forth in claim 6 including sealing means interposed between the inner and outer of said co-axial tube for preventing leakage from said tubes, and retaining means connected to the ends of said outer tubes opposite said manifold means for holding said sealing means in position.

13. Apparatus as set forth in claim 12 further including control means for controlling the operation of said apparatus, said control means including limit switch means, said limit switch means being slidably mounted on said support and having actuators interposed in the path of said retaining means, whereby said retaining means serve to actuate said limit switches as said manifold means is reciprocated.

14. Apparatus as set forth in claim 6 further including cover means affixed to both of said blocks, thereby to enhance the rigidity of said apparatus and protect said co-axial tubes.

15. Apparatus as set forth in claim 14 further including a protective bellows, one end of said bellows being affixed to the block supporting said bearing means, the other end of said bellows being affixed to said manifold means, thereby to protect said tubes when extended.

16. Apparatus as set forth in claim 6 wherein at least one of said outer tubes includes ball detent cam means, said support including spring loaded ball detent means engaging said cam means when said apparatus is in the retracted position thereby to restrain said apparatus in said retracted position.

17. A reciprocator for use with fluid responsive means to be transversed between advanced and retracted positions, said reciprocator comprising in combination a supporting base structure, reciprocatable means for carrying the fluid responsive means, drive means attached to said supporting structure and having a driven member attached to said reciprocatable means for traversing same between extended and retracted positions, a plurality of telescoping tube sets each having an inner tube and an outer tube slidable therover, one end of each of said tube sets being connected to said supporting structure and the opposite end to said reciprocatable means so that reciprocation thereof causes said tubes to telescope one over the other, bearing means interposed between said supporting structure and said telescoping tube sets for supporting said tube sets intermediate their ends, and means supplying fluid to the tube sets at the end thereof connected to the supporting structure, said fluid responsive means being connected to said reciprocatable means for receiving fluid from said tube sets, whereby said tube sets serve to support said fluid responsive means for reciprocation and to supply fluid for operation thereof.

18. A reciprocator as set forth in claim 17 wherein the supporting structure comprises a base plate having two spaced blocks affixed thereto, said inner tubes each having an end affixed to one of said blocks, the opposite ends of the outer tubes being connected to said reciprocatable means, the other of said blocks carrying said bearing means, said bearing means engaging said outer tubes for supporting said telescoping tube sets for reciprocation.

19. A reciprocator as set forth in claim 18 further including internal bearing means interposed between the inner and outer tube of each tube set.

20. A reciprocator as set forth in claim 19 wherein each of said inner tubes has a step formed at the end thereof opposite the fixed end, said internal bearing means including bushing means seated on said step and engaging the inner surface of said outer tube, and means retaining said bushing means in position on said step.

21. A reciprocator as set forth in claim 18 wherein the drive means is a pneumatic cylinder, said cylinder having a body interposed between said blocks, a piston within said body and a piston rod affixed to said piston, the piston rod being connected to said reciprocatable means for traversing same, and tie rods for drawing said blocks to said body whereby the blocks serve as cylinder heads.

22. A reciprocator as set forth in claim 18 including sealing means interposed between the inner and outer of said telescoping tube for preventing leakage from said tube, and retaining means connected to the ends of said outer tubes opposite said reciprocatable means for holding said sealing means in position.

23. A reciprocator as set forth in claim 22 further including control means for controlling the operation of said reciprocator, said control means including limit switch means, being slidably mounted on said supporting structure and having actuators interposed in the path of said retaining means, whereby said retaining means serve to actuate said limit switches as said reciprocatable means is traversed.

* * * * *